United States Patent [19]
Saliba

[11] Patent Number: 5,883,864
[45] Date of Patent: Mar. 16, 1999

[54] MEDIA LIBRARY HAVING LOCALLY VECTORED DRIVE ADDRESSING

[75] Inventor: George A. Saliba, Northboro, Mass.

[73] Assignee: Quantum Corporation, Milpitas, Calif.

[21] Appl. No.: 804,766

[22] Filed: Feb. 24, 1997

[51] Int. Cl.$^6$ .............................. G11B 15/68; G11B 27/00
[52] U.S. Cl. ................................. 369/30; 369/34; 360/92
[58] Field of Search ............................... 360/92; 369/34, 369/30

[56] References Cited

U.S. PATENT DOCUMENTS

| | | | |
|---|---|---|---|
| 4,932,826 | 6/1990 | Moy et al. | 360/92 |
| 5,121,483 | 6/1992 | Monahan et al. | 369/34 |
| 5,231,552 | 7/1993 | Schneider et al. | 360/92 |
| 5,236,296 | 8/1993 | Ostwald | 414/280 |
| 5,337,297 | 8/1994 | Kvfte et al. | 369/36 |
| 5,377,121 | 12/1994 | Dimitri et al. | 369/34 |
| 5,598,385 | 1/1997 | Mizukami et al. | 360/92 |
| 5,760,995 | 6/1998 | Heller et al. | 360/92 |

OTHER PUBLICATIONS

"Information Technology–Small Computer System Interface–2", X3T9.2 Project 375D, *American National Standard of Accredited Standards Committee X3*, Mar. 21, 1994, pp. 379–410.

*Primary Examiner*—Eddie P. Chan
*Assistant Examiner*—Yamir Encavnación
*Attorney, Agent, or Firm*—David B. Harrison

[57] ABSTRACT

Media unit access time within a media library is minimized by revectoring an address of a closest available media unit player to match a logical address of a media unit player specified within a media exchange command received from a host commanding the library to move a media unit from a command-specified slot location holding a media unit desired by a host computer to the command-specified media player logical address.

21 Claims, 5 Drawing Sheets

MEDIA LIBRARY HAVING LOCALLY VECTORED DRIVE ADDRESSING

FIELD OF THE INVENTION

The present invention relates to data storage. More particularly, the present invention relates to an expandable digital storage media library having locally vectored player/drive addressing.

BACKGROUND OF THE INVENTION

Computer digital data storage devices are required to provide increasingly high data storage capacities and data transfer rates. This is particularly true with the advent of the so-called "world wide web" which is consuming ever-increasing amounts of digital content information. One family of storage devices suitable for storing vast amounts of information content is streaming tape. Streaming tape drives are so named because multiple blocks of user data are typically written to, or read from, tape in a single streaming operation, rather than as a series of start-stop operations. Streaming tape is particularly well suited for backup operations as well as for providing archival and retrieval operations for vast quantities of information content. In this regard, optical storage is also known for voluminous content storage and retrieval.

Tape libraries are known in the art. One example of a tape library is provided by the Ostwald U.S. Pat. No. 5,236,296. In this patent, a tape library is described in FIG. 8 as comprising a vast, semi-cylindrical array of tape cartridge storage slots aligned generally along a fixed radius of curvature. A central cartridge inventory is maintained by a library controller, so that logical requests for a particular drive and cartridge may be translated by the library controller into physical device locations and electromechanical operations. In this prior example, a robotic arm rotating at a focus of the cylindrical segment is elevated and rotated to a particular cartridge storage slot. A picker-gripper mechanism of the arm then "picks" and "grips" the cartridge stored in the slot and moves the cartridge out of the slot and into a temporary transport slot of the arm. The robotic arm is then commanded to perform a second rotation/elevation operation in order to present the retrieved tape cartridge to a loading tray of the selected tape drive, and the drive then loads the cartridge and threads the tape for recording/playback operations, following initial setup and calibration routines conventional with tape drives. The drive may be one of several drives accessible by the robotic arm.

One obvious drawback of this prior "move media cartridge to drive" approach is the time delay incurred between receiving the tape cartridge request and having the cartridge ready for user data operations at the selected tape drive. Another drawback of this prior approach is that a single robotic arm mechanism services hundreds, if not thousands, of tape cartridge slot locations, and any failure of the arm mechanism essentially removes all of the tape cartridges it services from automated access within the library. This prior approach permits scaling only in the sense of selectively filling up the available tape cartridge slots with tape cartridges.

Some improvement over the above approach is described in Dimitri et al. U.S. Pat. No. 5,377,121 for "Automated Storage Library Having Inventory at Picker Level". This patent describes an optical disk library of four storage boxes with a single personal computer acting as a library controller for two optical disk library storage boxes. Each storage box includes a picker controller which maintains a physical inventory of optical disks accessible by a controlled disk picker gripper mechanism within the particular box. In response to requests from the library controller, the picker controller decides where an optical disk is located and whether it must be moved, and issues appropriate commands to the mechanism to move the requested disk to an optical disk drive also present within the particular storage box. A discrete switching structure comprising separate switches is used to route information between the library controller and each selected optical disk drive.

In the preferred example described in the Dimitri et al. patent, two optical disk lists are included in the internal data structures of the two described library controllers. Each optical disk list includes the label of each optical disk for which the particular library controller is responsible, and the particular storage box containing the desired disk, but not having any information as to the actual physical location of the disk. Each picker controller maintains its disk location inventory list in a non-volatile, battery backed-up random access memory. Each disk inventory maintained by the picker includes disk identification/location information only for the disks present within the particular storage box serviced by the picker controller. As optical disks are inserted into, withdrawn from, or moved about a particular storage box of the library, the respective picker controller updates its optical disk inventory. While this approach represents an improvement over the tape library approach of the Ostwald patent, the approach essentially follows a "media-to-drive" approach with the latencies and drawbacks already noted for such approach.

It is also known in the art to physically move the media drive to a particular media cartridge location and thereupon load a cartridge at the location. Kvifte et al. U.S. Pat. No. 5,337,297 entitled: "Magazine Drawer Manipulation for a Data Carrier Loader" shows one approach. While this approach works, it has the same latencies expected of the media-to-drive approach, in that a massive object, the drive, must be translated to a cartridge location, and this movement operation requires a certain time interval.

Tape cartridge loaders provide a relatively low cost solution for very small data library applications. Typically, a cartridge loader includes a removable cartridge magazine that has slots for media cartridges, such as tape cartridges. A pass-through picker-gripper mechanism is positioned within the loader by a servo mechanism, and passes a selected cartridge into a transport tray, and then relocates to an oppositely facing media drive whereupon the media cartridge is loaded automatically into the media drive. The Schneider et al. U.S. Pat. No. 5,231,552 which is assigned to the same assignee as the present application describes a magazine and receiver for a cartridge loader. The loader mechanism is shown in mechanical overview in FIGS. 16A, 16B and 17 in the '552 patent. Media cartridge loaders have been improved and refined to support additional magazines and media drives, and media cartridge pass-through arrangements have been proposed for passing a selected cartridge from a first loader to an adjacently mounted second loader. While an effective, low cost, low capacity data library may be provided by using a media loader, a continuing problem remains because the media loaders also follow the conventional, traditional media-to-drive approach, discussed above.

A further approach for increasing the number of media cartridges which may be handled within a library environment is what is known as a "pass-through" arrangement. Commonly assigned, copending U.S. patent application Ser. No. 08/710,033 filed on Sep. 11, 1996, for "A Multi-Drive, Multi-Magazine Mass Storage and Retrieval Unit for Tape Cartridges" presents one example of a cartridge pass-through architecture.

Typically, media loaders operate in accordance with a standardized command structure. One such command structure is found in the Small Computer System Interface-2 draft standard X3T9.2 Project 375D (ANSI X3.131–199X). In this particular industry specification, a medium changer device includes a medium transport element, at least one storage element, and a data transfer element. An import/export element may also be supported. A storage element is identified as a storage slot for storing a standard medium unit, such as a disk or a tape cartridge. Typically, in order to access data on a standard medium unit, a host system will have to issue commands to both the medium loader and to the drive. The commands to the loader may include "move medium"; or, "exchange medium" and "read element status". Commands directed by the host to the drive may include "test unit ready", "inquiry", "start-stop" and "load-unload" commands, in addition to the obvious "read/write" commands. One important characteristic worth noting about this command structure is that the logical address of the drive is supplied to the media loader as a destination, as well as to the drive itself for subsequent read or write operations from or to the selected and automatically loaded medium unit.

A hitherto unsolved need has remained for a more effective architecture for an expandable digital storage media library having vectored drive addressing for overcoming significant limitations and drawbacks associated with the prior approaches.

SUMMARY OF THE INVENTION WITH OBJECTS

A general object of the present invention is to improve performance of storage medium changer devices, such as tape cartridge loader units.

Another general object of the present invention is to enable assembly of a media library by adding additional media loader units and thereby provide storage scalability.

One more object of the present invention is to minimize physical movement of a media unit to a player within a media library by determining a closest available player and vectoring a logical device address to the player.

In accordance with one aspect of the present invention, a digital data storage unit, such as a tape cartridge loader mini-library, includes a multiplicity of tape cartridge slots for receiving tape cartridges. Each cartridge includes a spool of magnetic recording tape. The slots are arranged as zones, and each zone may correspond to a tape cartridge magazine. At least a plurality of tape cartridges are actually loaded into predetermined slot locations. A plurality of tape drives are present within the storage unit. Each drive is located in physical proximity to a particular zone of slots, in the sense of being physically closer to one zone than other zones within the unit. A loader mechanism selectively moves a tape cartridge between a slot and a selected one of the tape drives, under the control of a storage unit control. The storage unit control is connected by a bus structure such as a SCSI-2 bus to a host computer for receiving commands from the host. The storage unit control includes a tape cartridge inventory function for obtaining and maintaining an inventory of the tape cartridges loaded into the particular slots, a command decode function for receiving and decoding a slot-to-logical tape drive exchange command from the host, a determination function for determining a closest available one of the tape drives to a slot location specified by the exchange command, and a tape drive logical address control function for setting a logical address and/or other attributes of the closest tape drive to match a logical address of a destination tape drive in the exchange command, so that when the loader mechanism moves the requested tape cartridge from the slot location to the closest available tape drive and loads the requested media unit into the closest available tape drive, the tape drive will have an address corresponding to the logical address of the destination tape drive specified by the exchange command. Thus, the physical translation distance and cartridge displacement time between the particular slot and the tape drive determined to be closest to the slot is a minimized cartridge handling time.

In accordance with another aspect of the invention, a method for controlling a digital data storage unit is provided. The digital data storage unit comprises a multiplicity of storage media slots for receiving storage media units, such as tape cartridges, arranged into plural zones. At least a plurality of media storage units are loaded in some of the slots. A plurality of media unit players are included within the storage unit. Each player is located in close physical proximity to a particular zone of slots. A loader mechanism selectively moves a media unit between a slot and one of the plurality of media unit players. A storage unit control is connected by a bus structure such as a SCSI-2 bus to a host computer and carries out the following steps:

decoding a host command at the storage control unit including a source address corresponding to a slot location, and a destination address corresponding to a logical media unit player, determining a closest available media unit player to the slot location, changing the logical identifier of a physical media unit player determined to be closest to the slot location to correspond to the logical media unit player, and moving the media storage unit at the slot location to the physical media unit player.

These and other objects, aspects, advantages and features of the present invention will be more fully understood and appreciated upon consideration of the accompanying drawings in accordance with the following detailed description thereof.

DETAILED DESCRIPTION OF PREFERRED EMBODIMENTS

Figure 1:
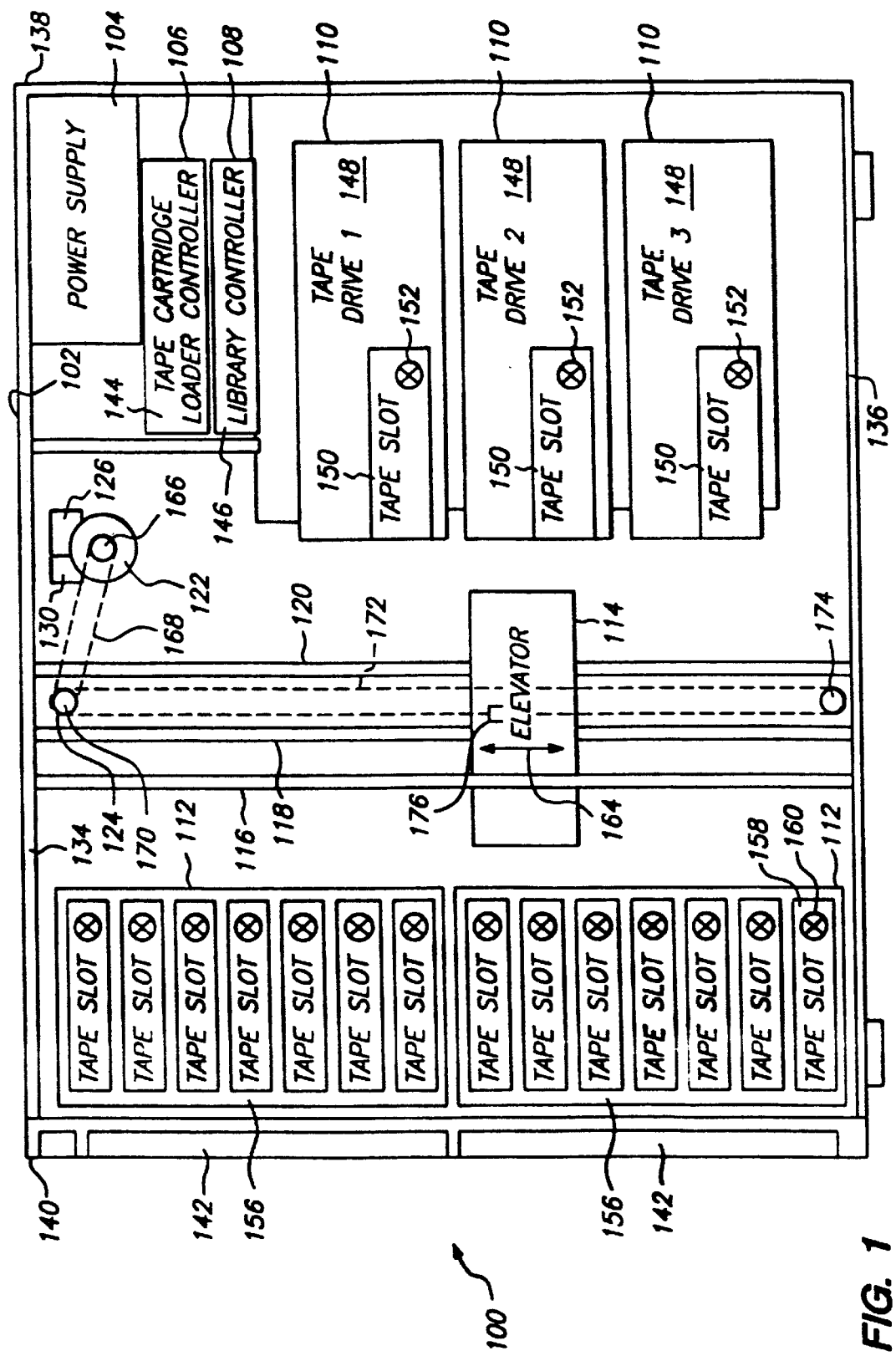
FIG. 1 is a block diagram of a multi-cartridge tape loader system in accordance with established principles.
Figure 2:
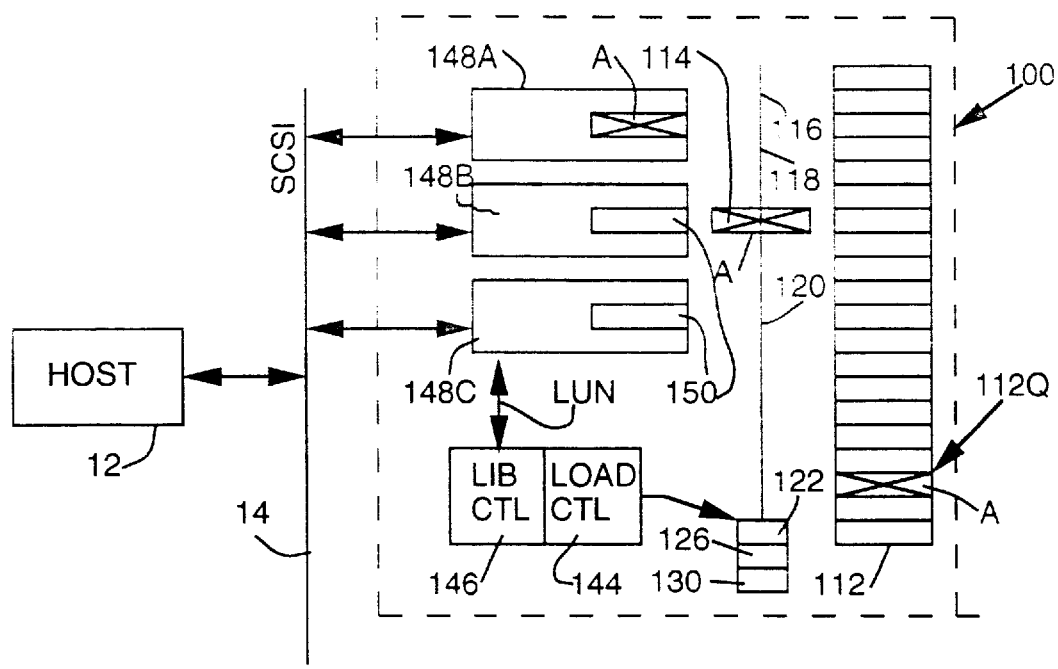
FIG. 2 is a simplified block diagram of the FIG. 1 multi-cartridge tape loader system having a first connection arrangement to a computing environment in accordance with established principles.
Figure 3:
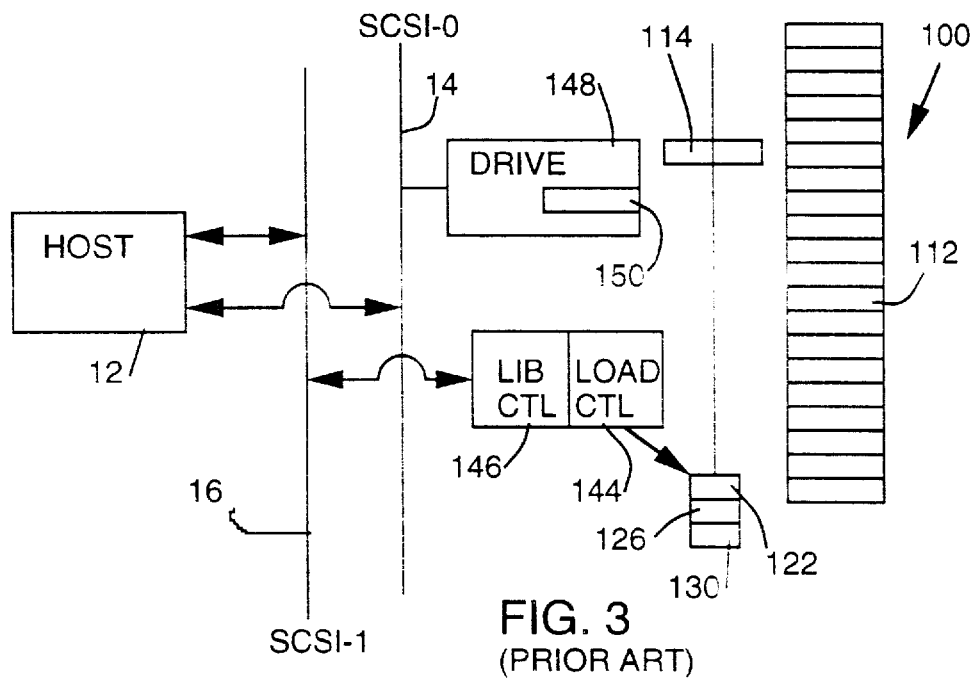
FIG. 3 is a simplified block diagram of the FIG. 1 multi-cartridge tape loader system having a second connection arrangement to a computing environment in accordance with established principles.

In order to understand and appreciate the present invention, a summary of conventional multi-cartridge tape loader practice is presented in FIGS. 1, 2 and 3. In these figures, the same reference numerals are used to identify substantially identical structural elements.

FIG. 1 shows a top view of the multi-drive, multi-magazine mass storage and retrieval tape loader unit 100 for tape cartridges. This loader unit 100 is described in greater detail in commonly assigned, copending U.S. Pat. No. 5,760,995 for "A Multi-Drive, Multi-Magazine Mass Storage and Retrieval Unit for Tape Cartridges", the disclosure thereof being incorporated herein by reference. The '995 patent claims priority from U.S. Provisional Patent Application Serial No. 60/008,028, filed on Oct. 27, 1995.

As shown in FIG. 1, the mass storage and retrieval unit 100 includes a housing 102, a power supply 104, a tape cartridge loader controller slot 106, a library controller slot 108, a plurality of tape drive slots 110, a plurality of tape cartridge magazine slots 112, a tape cartridge pass-through elevator 114, at least one tape cartridge elevator guide shaft 116, a drive shaft 118, a rack drive shaft 120, a tape cartridge elevator motor 122, a pulley drive assembly 124, a roller drive shaft motor 126, and, a rack drive shaft motor 130.

The housing 102 may be substantially rectangular or square in cross section and includes a top side wall 134, a bottom side wall 136, a rear wall 138, and a front panel 140. The front panel 140 includes a plurality of access doors 142 pivotally mounted onto the front 140 opposite the tape cartridge magazine slots 112 that permit manual loading and unloading of tape cartridges by an operator into the tape cartridge magazines within the mass storage and retrieval unit 100. The housing 102 may be constructed of any number of conventional materials such as, for example, those utilized in industry standard rack mount cabinets.

The power supply 104 may be positioned in a rear corner of the housing 102 adjacent to the tape cartridge loader controller slot 106 and library controller slot 108. The power supply 104 provides electrical power in a well known manner to the tape cartridge loader controller slot 106, library controller slot 108, the plurality of tape drive slots 110, tape cartridge elevator motor 122, roller drive shaft motor 126, and rack drive shaft motor 130. The power supply 104 is interfaced with these components as well as with an external power source in a well known manner using industry standard cabling and connections.

The tape cartridge loader controller slot 106 receives a tape cartridge loader controller card 144 while the library controller slot 108 receives a library controller card 146. The tape cartridge loader controller 144 may comprise a standard driver interface unit for receiving digital commands and translating the commands into driving currents, such as step pulses for controlling stepper motors. The library controller 146 may comprise a standard programmable general purpose computer formed on a single plug-in card unit and preferably will include a suitably programmed microprocessor or microcontroller. The input-output connections between the tape cartridge loader controller 144, library controller 146 and the other components of the unit 100 may comprise well known industry standard cabling and communication protocols.

Alternatively, the loader controller card 144 may be included as circuitry within or on the library controller card 146. Furthermore, the mass storage and retrieval unit 100 may be operated by means of the cartridge loader controller 144 and library controller 146 for use in conventional data processing, or alternatively for use in a video-on-demand machine. Connections of the unit 100 to conventional bus structures are shown in FIGS. 2 and 3 and discussed hereinafter.

Each of the tape drive slots 110 receives a standard tape drive 148 such as, for example, a Quantum DLT2000XT™, DLT4000™, or DLT7000™ cartridge tape drive, or equivalent, which has been adapted to fit into the tape drive slots 110. The tape drive 148 includes a tape cartridge slot 150 and a tape cartridge sensor 152 within the slot 150 which generates a tape cartridge presence signal. A stand-alone tape drive 148 may be adapted for use in the mass storage and retrieval unit 100 by removing the handle at the front of the drive 148, removing the bezel from the front of the drive 148, and installing the tape drive 148 onto a conventional mounting bracket that supports the tape drive 148 within the housing 102 and provides adequate alignment of the tape drive 148 relative to the other components of the unit 100. The tape drive 148 further includes a handle motor assembly and handle actuator and transmission to provide automatic actuation of the tape drive door under the control of the tape cartridge loader controller 144 and library controller 146. The handle motor assembly may comprise a stepper motor or DC servo motor. The handle actuator and transmission may comprise any conventional transmission for converting rotation of the output shaft of the assembly into rotation and translation of the tape drive door.

Each of the tape cartridge magazine slots 112 receives a standard tape cartridge magazine 156 such as, for example, a Quantum TK85-M seven cartridge magazine adapted for use in the mass storage and retrieval unit 100. This cartridge is shown, for example, in the above-referenced U.S. Pat. No. 5,231,552 entitled: "Magazine and Receiver for Media Cartridge Loader", the disclosure thereof being incorporated herein by reference. The tape cartridge magazine 156 includes one or more tape cartridge slots 158, a tape cartridge presence flag 160 within each slot 158 which provides an indication of the presence or absence of a tape cartridge, and a release lever 162 for each slot 158. The standard tape cartridge magazine 156 as described in U.S. Pat. No. 5,231,552 may be adapted by removing the handle from the top of the magazine 156, adding a handle to the side, and modifying the lever lock by adding a one-way spring gate to force the guide pin to follow the proper path and thereby prevent incorrect manual operation when the magazine 156 is laid on its side.

As shown in FIG. 1 the tape cartridge elevator 114 is positioned within the housing 102 between the plurality of tape drive cartridge slots 150 and the plurality of tape cartridge magazine slots 112. In this manner, the tape cartridge elevator 114 is able to load and unload tape cartridges to and from all of the tape drives 148 and tape cartridge magazines 156. The tape cartridge elevator 114 is actuated in the directions indicated by the arrows 164 by the tape cartridge elevator motor 122 and pulley drive assembly 124 under the control of the tape cartridge loader controller 144 and library controller 146. The pulley drive assembly 124 includes a cartridge drive motor pulley 166, a short drive belt 168, an elevator drive pulley 170, a long drive belt 172, and an elevator idler pulley 174. The tape cartridge elevator 114 is slidably mounted upon at least one tape cartridge elevator guide shaft 116 and removably attached to the long drive belt 172 of the pulley drive assembly 124 at a connection point 176. The tape cartridge drive motor pulley 166 is rigidly attached to the output shaft of the tape cartridge drive motor 122. The elevator drive pulley 170 and the elevator idler pulley 174 are rotatably supported by the left and right side walls of the housing 102. The short drive belt 168 is mounted on and between the tape cartridge drive motor pulley 166 and the elevator drive pulley 170 while the long drive belt 172 is mounted on and between the elevator drive pulley 170 and the elevator idler pulley 174.

Under the control of the tape cartridge loader controller 144 and library controller 146, the tape cartridge elevator motor 122 rotates the tape cartridge drive motor pulley 166. Rotation of the tape cartridge drive motor pulley 166 in turn rotates the elevator drive pulley 170. Rotation of the elevator drive pulley 170 in turn causes the long drive belt 172 to move about the elevator drive pulley 170 and the elevator idler pulley 174. As a result of this arrangement, the tape cartridge elevator 114 translates in the direction indicated by the arrows 164 when the tape cartridge elevator motor 122 is rotated under the control of the tape cartridge loader controller 144 and library controller 146 by virtue of the connection 176 with the long drive belt 172.

The tape cartridge elevator motor 122 may comprise any controllably positionable motor such as, for example, a stepper motor, a servo motor, or a DC motor. The pulley drive assembly 124, which converts rotation of the output drive shaft of the tape cartridge elevator motor 122 into translation of the tape cartridge elevator 114, may be replaced with equivalent means such as, for example, a lead screw driven directly by the tape cartridge elevator motor 122 with the tape cartridge elevator 114 including a suitable connection threadably mounted onto the lead screw, or alternatively, the elevator drive pulley 170 may be driven directly from the output shaft of the tape cartridge elevator motor 122 thereby eliminating the need for the short drive belt 168. Other similar alternative means for converting a rotational input into a translational output may also be used in the present embodiment.

The roller drive shaft 118 is rotatably supported at opposite ends by the top side wall 134 and bottom side wall 136 of the housing 102. The roller drive shaft 118 further passes through and is operably coupled to the tape cartridge elevator 114. The roller drive shaft 118 is rotated by the roller drive shaft motor 126 and roller drive shaft coupling assembly under the control of the tape cartridge loader controller 144 and library controller 146. The roller drive shaft coupling assembly driven by motor 126 may comprise any conventional transmission for coupling a rotary input to a rotary output which may include belts and pulleys, a gear train, or some combination of both.

The rack drive shaft 120 is rotatably supported at opposite ends by the top side wall 134 and bottom side wall 136 of the housing 102. The rack drive shaft 118 further passes through, and is operably coupled to, the tape cartridge elevator 114. The rack drive shaft 120 is rotated by the rack drive shaft motor 130 and a rack drive shaft coupling assembly coupled to the motor 130 which operates under the control of the tape cartridge loader controller 144 and library controller 146. The rack drive shaft coupling assembly driven by motor 130 may comprise any conventional transmission for coupling a rotary input to a rotary output which may include belts and pulleys, a gear train, or some combination of both.

The roller drive shaft motor 126 and rack drive shaft motor 130 may comprise any controllably positionable electric motor such as, for example, a stepper motor, a servo motor, or a DC motor. In a one embodiment, the roller drive shaft motor 126 and rack drive shaft motor 130 are stepper motors and are further positioned immediately adjacent one another.

Turning to FIG. 2, the tape loader unit 100 is shown connected to a host computer 12 via a bus structure 14, such as a "SCSI-2" bus in which the host 12 acts as an initiator, and the unit 100 acts as a series of targets. In the FIG. 2 example a single SCSI ID path extends between the bus 14 and the drives 148A, 148B and 148C located within the loader 100.

The bus structure 14 is conventional and may be exemplified by the "Small Computer System Interface-2" or SCSI-2 standard. This interface is described in more particularity in "Working Draft X3T9.2 Project 375D, Information Technology—Small Computer System Interface—2" proposed by American National Standard of Accredited Standards Committee X3 (ANSI). Section 17 of this draft standard specifies a SCSI-2 bus architecture and command repertoire for "Medium-changer devices", such as the multi-cartridge tape loader unit 100 shown in FIG. 1.

In the FIG. 2 example, each drive 148A, 148B, 148C is assigned a unique SCSI ID. One of the drives, e.g. drive 148C provides an internal path between the SCSI bus 14 and the library controller 146. In this embodiment, the library controller is identified as having the same SCSI ID address as drive 148C, and also a suffix address known as a "Logical Unit Identifier". Communications between the host 12 and the drive 148C which include the LUN, e.g. LUN#1, will pass to the library controller 146 and be decoded and acted upon.

In the FIG. 3 example, the library controller 146 has its own unique SCSI ID on e.g. a second SCSI bus 16. Both of the buses 14 and 16 are serviced by the host computer 12 in this example. While only one host 12 and drive 148 are shown in FIG. 3, those skilled in the art will appreciate that a considerable number of "initiators" and "targets" are supported by the SCSI-2 bus convention, as by implementation and use of the LUN suffixes within each SCSI ID number.

In accordance with the SCSI-2 industry standard, the tape loader unit 100 will receive, decode, execute and respond to commands from the host. Commands unique to medium changer devices, such as the library controller 146 of unit 100 include, for example: CHANGE DEFINITION, EXCHANGE MEDIUM, INITIALIZE ELEMENT STATUS, INQUIRY, LOG SELECT, LOG SENSE, MODE SELECT, MOVE MEDIUM, POSITION TO ELEMENT (DRIVE OR STORAGE SLOT) PREVENT ALLOW MEDIUM REMOVAL, READ BUFFER, READ ELEMENT STATUS, RECEIVE DIAGNOSTIC RESULTS, RELEASE, REQUEST VOLUME ELEMENT ADDRESS, REQUEST SENSE, RESERVE, REZERO UNIT, SEND DIAGNOSTIC, SEND VOLUME TAG, TEST UNIT READY, and WRITE BUFFER. These commands are defined in the ANSI draft specification referenced above, and the interested reader is directed to that specification for further details.

One command, EXCHANGE MEDIUM, will be explained in some detail. This command provides a way for the host 12 to cause the unit 100 to move a storage medium (tape cartridge) from a source location to a destination location. The source location may be a particular slot 112 having a unique logical location. The destination may be a particular slot 150 of a specified drive, e.g. drive 148A within unit 100. Multiple destinations may be specified. For example, the structure of this command supports a first destination address, which may be a logical address corresponding to the elevator 114, and a second address which maybe a logical address corresponding to slot 150 of drive 148A. If the first destination address is either slot, the address of the elevator 114 is implied by the library controller 146.

As shown in FIG. 2, when the EXCHANGE MEDIUM command is received and acted upon by the, the elevator moves to the source slot location and checks to see if a cartridge, such as cartridge 112Q is present. If the cartridge is present, it is translated into the elevator 114 from the source slot. The elevator 114 then moves the cartridge 112Q to a position opposite the slot 150 of drive 148A, and proceeds to transfer the cartridge 112 into the slot of the host-selected drive. The cartridge is then loaded and accessed by the drive 148A in conventional fashion in accordance with subsequent commands sent from the host 12 to the drive 148A to read or write data from or to the tape in the cartridge. When the host 12 has completed operations with the particular cartridge 112Q, it may be returned to its slot in accordance with another EXCHANGE MEDIUM command, which specifies drive 148A as the source location, and the original slot 112 as the final destination location. Obviously, a time latency is required in moving the cartridge 112Q from its slot to drive 148A and back. This time is a direct function of the physical distance or separation between the slot 112 and the drive 148A, and may be a considerable distance in an actual unit 100.

Figure 4:
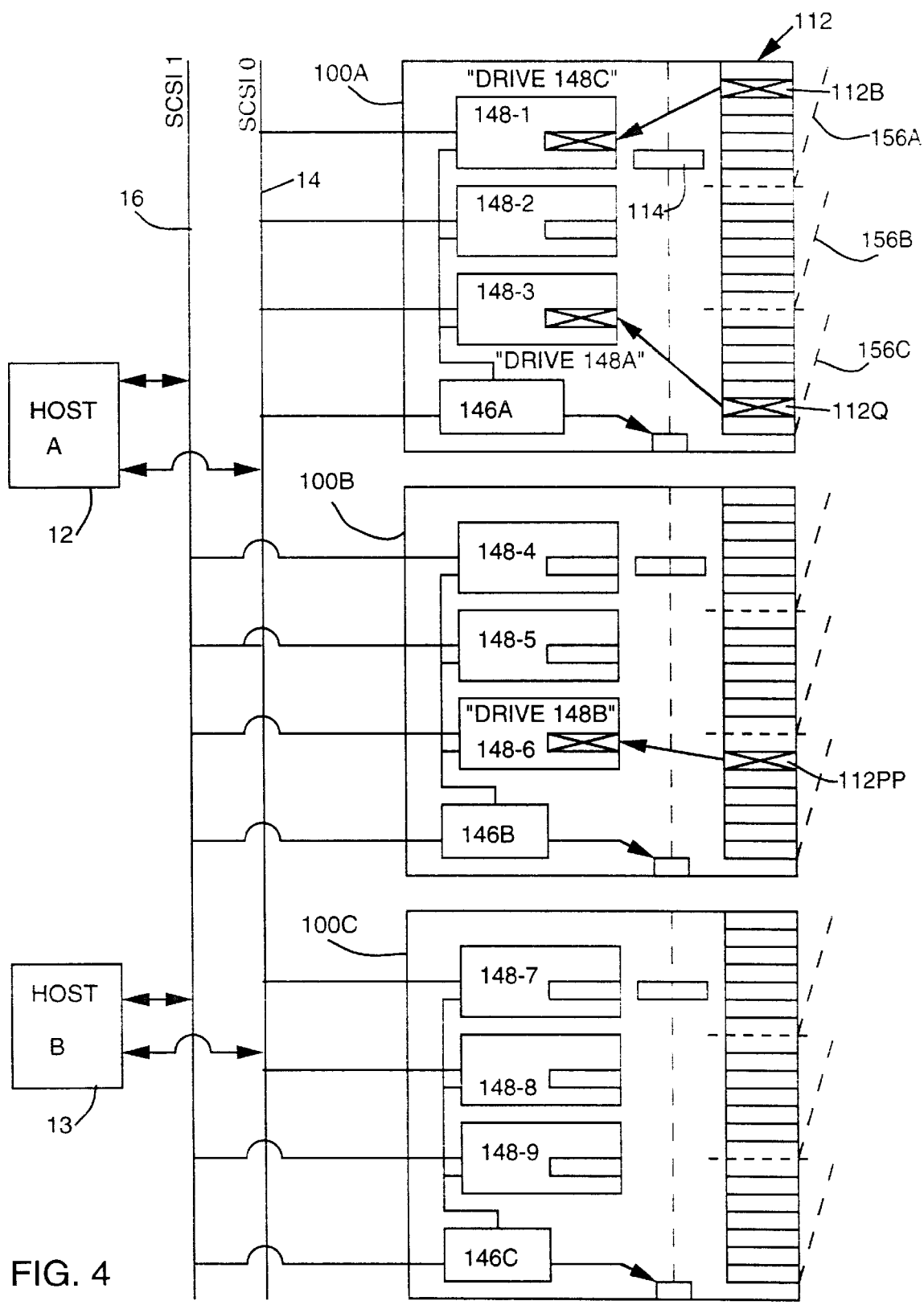
FIG. 4 is a simplified block diagram of an expandable multi-cartridge tape loader system within a computing environment in accordance with principles of the present invention.

Referring now to FIG. 4 a cartridge loader unit 100A is configured and operates in accordance with principles of the present invention. There may be multiple units 100N attached to one or more bus structures, such as SCSI-2 buses 14 and 16, and there may be one or more hosts, e.g. hosts 12 and 13, acting as initiators on these buses. Each unit has a library controller 146A which is effectively attached to the bus 14 or 16 and has its own logical address. When a host dispatches a medium-changer command, such as EXCHANGE MEDIUM, the controller 146A locates the source address and the final destination address and determines a closest available one of the drive resources within the unit 100A. For example, an EXCHANGE MEDIUM command issued by a host 12 or 14 may specify a source address as slot 112B and a destination address as logical drive "148C". Actually, the logical address "drive 148C" may nominally translate to a physical drive 148-3, which is some greater distance away from slot 112B than other physical drives. Upon decoding of this host command, the library controller 146A determines that location 112B is closest to physical drive 148-1, rather than physical drive 148-3. The controller 146A also may determine that the next closest drive element to slot 112B is physical drive 148-2.

With this information in hand, the controller 146A determines whether drive 148-1 is available or busy. If the drive 148-1 is available, the controller 146A alters the logical address of physical drive 148-1 to become "drive 148C" and physical drive 148-1 thereupon intercepts and executes host commands directed to "drive 148C" over the bus structure 14. Alternatively, and equally preferably, after an inventory of tape cartridges has been conducted and recorded, each physical drive 148 may be assigned a zone of adjacent cartridges as the primary servicing drive for those cartridges. The on-board microcontroller within each drive 148 then monitors the SCSI bus and intercepts a loader command addressing a cartridge slots within its zone of cartridges, and thereupon adapts its logical address to the logical destination address specified in the loader command.

Contemporaneously with the revectoring of the drive logical address, the library controller 146A causes the elevator 114 to move the tape cartridge from slot 112B to physical drive 148-1, thereby minimizing the transport distance for this cartridge. If physical 148-1 were not available at the time of the incoming command, the library controller 146A would move the cartridge from slot 112B to physical drive 148-2 and it would have its logical address revectored to be "drive 148C", and so forth. In this manner the physical movement of each tape cartridge is minimized by revectoring host commands to drive elements 148 determined to be available and physically closest to the source address slot location.

Another example shown in FIG. 4 is a host command for access to the cartridge at slot 112Q, with a drive element identification being "drive 148A". In similar fashion, the library controller 146A determines that slot 112Q is closest to physical drive 148-3, and, if drive 148-3 is available, causes that drive to become logical drive "148A". In the example of FIG. 4, there are three tape cartridge magazines 156A, 156B and 156C associated with loader unit 100A. Each magazine effectively defines an access zone which is established in relation to a particular drive. For example, the slots of magazine 156A are physically closest to physical drive 148-1; the slots of magazine 156B are physically closest to physical drive 148-2; and, the slots of magazine 156C are physically closest to physical drive 148-3.

As shown in FIG. 4 multiple units 100 may be attached to, and supported by buses 14 and 16. In FIG. 4, two additional units 100B and 100C are attached. These units 100B and 100C are substantially identical to unit 100A, except that the library controller elements have their own unique logical addresses. By using drive resource element revectoring in accordance with principles of the present invention, a very high level of operability and flexibility is achieved. For example, if the unit 100B receives a request to move a cartridge from its slot 112PP to "drive 148B", and drive 148B were physically fixed in unit 100A, an ILLEGAL REQUEST status value would have to be returned to the requesting host 12 or 13. However, in accordance with principles of the present invention, a locally proximate drive, such as drive 148-6 may have its logical target element address revectored to "drive 148B" (assuming that no other drive connected to buses 14 or 16 is presently vectored to "drive 148B"), and the command can thereupon be completed in a shortest practical time.

Figure 5:
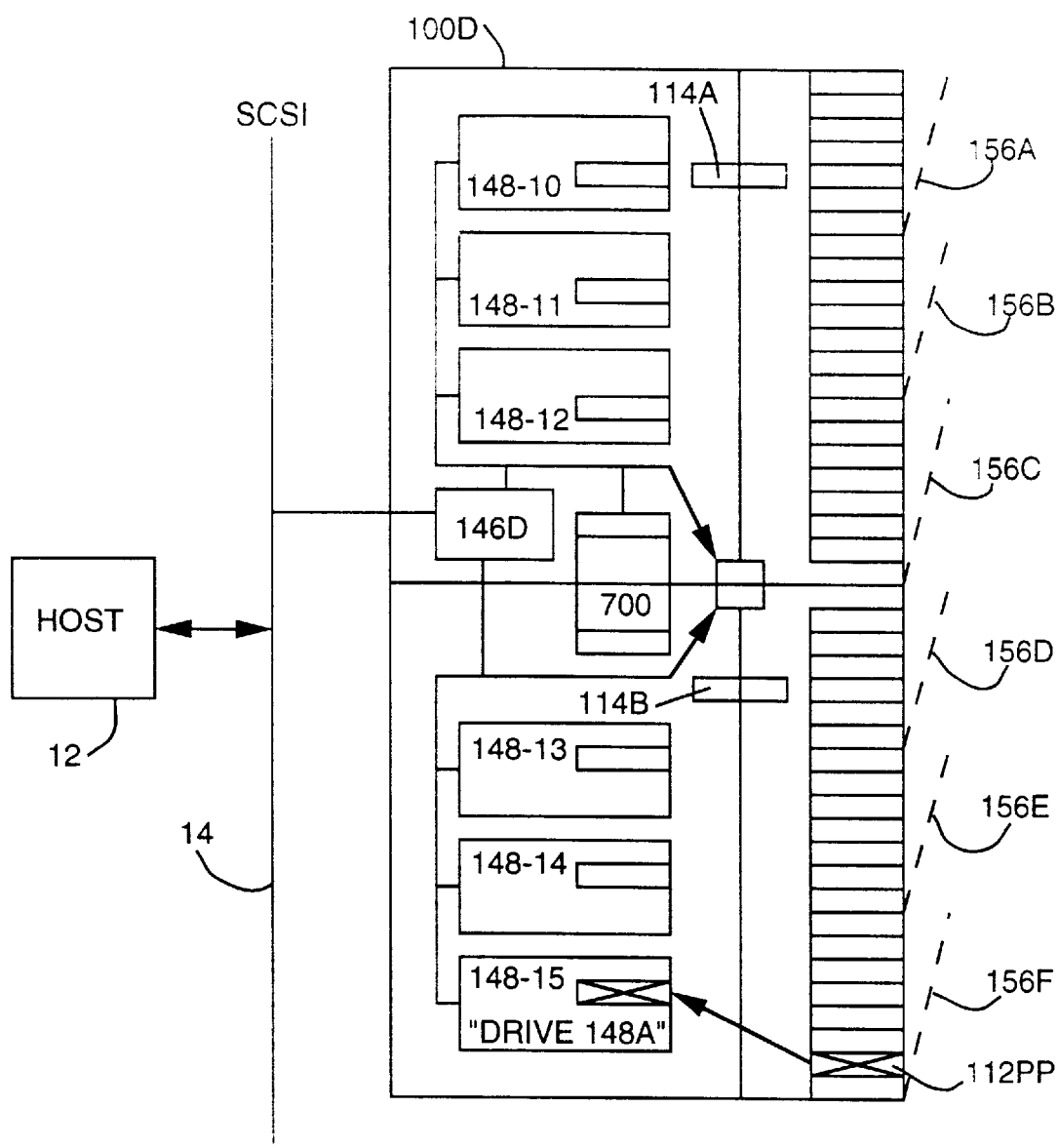
FIG. 5 is a block diagram of an alternative expandable multi-cartridge taper loader system within a computing environment in accordance with principles of the present invention.

FIG. 5 illustrates yet another embodiment of the present invention. In this example, two loader units have been joined together to form a single device 100D. The two units are identical to the units 100A, 100B and 100C, except that a single library controller card 146D is provided to control both units including elevators 114A and 114B and six drive resource elements, i.e. physical drives 148-10, 148-11, 148-12, 148-13, 148-14, and 148-15. A pass-through mechanism 700 as described in the referenced U.S. Pat. No. 5,760,995 enables tape cartridges to be passed between the two physical units. In the example of FIG. 5 an EXCHANGE MEDIUM command calling for a cartridge at source address 112PP to be moved to "drive 148A", would, if operating in accordance with the prior art, require the cartridge at slot 112PP to be loaded into lower elevator 114B, placed into the pass through mechanism 700, elevated to the upper unit, picked up by upper elevator 114A and transported to physical drive 148-10 otherwise hard configured as "drive 148A". In accordance with the present invention, the library controller 146D determines that the closest physical drive to slot 112PP is drive 14815. If drive 148-15 is available, the host command specifying destination element 148A is revectored to physical drive 148-15, and relatively short duration operation is performed by lower elevator 114B in moving the cartridge at slot 112PP to physical drive 148-15.

Figure 6:
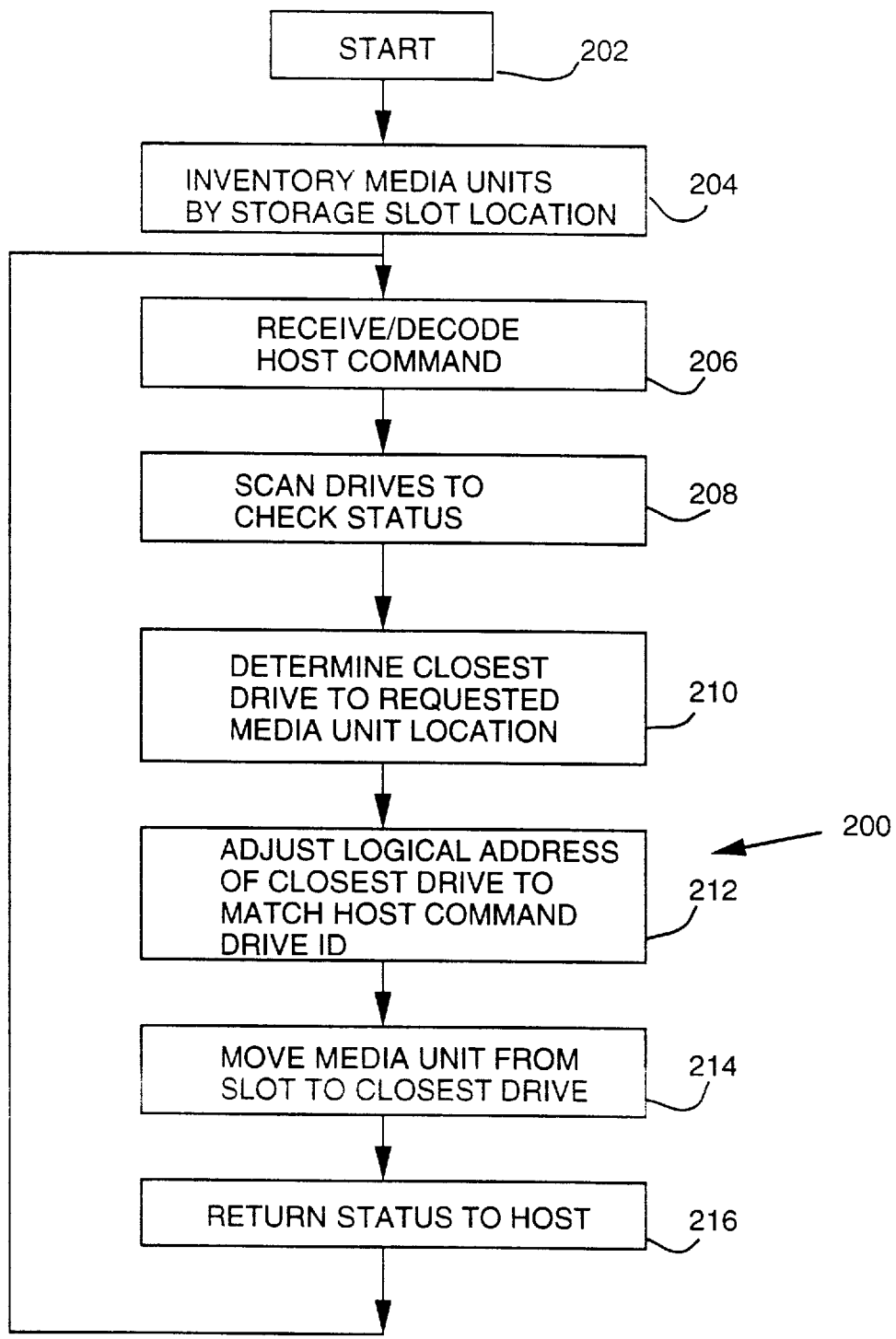
FIG. 6 is a flow diagram of a control process used by the tape loader controllers of the FIGS. 4 and 5 embodiments of the present invention.

A flowchart of a control process 200 implementing the present invention and executed e.g. by the library controllers 146 within the examples of FIGS. 4 and 5 is set forth in FIG. 6. Therein, a power on start step 202 is performed which initializes the unit 100 to an operative state. A related initial step includes taking an inventory of cartridges against slot locations at a step 204. The inventory may be by any conventional fashion, such as optically scanning a bar code affixed to each cartridge in order to ascertain and record e.g. a unique volume tag and associate the volume tag with the slot logical address. The inventory may also include an inventory of available active elements, such as the drives and the pass-through element 700, if present.

The library controller 146 receives and decodes host commands at a step 206. If the command is e.g. an EXCHANGE MEDIUM command, the controller 208 scans the drives to determine which drive resources are presently available as destination elements in order to execute the command. Once this scan is completed, a step 210 is performed. Step 210 determines which available physical drive resource is physically closest to the source address (slot location 112n holding the desired tape cartridge). Once the closest physical address is determined, the controller 146 executes step 212 which vectors the logical address of the closest physical drive to correspond to the final destination address ("drive 148N") specified by the EXCHANGE MEDIUM command. Thereupon, the revectored physically closest drive 148-n is able to respond to host commands sent to drive 148N following the EXCHANGE MEDIUM command which established the logical address vector. Contemporaneously, the library controller 146 carries out a step 214 of moving the cartridge from slot 112n to physical drive 148-n now set to logical destination address 148N. At an appropriate time status of unit 100 is returned by the library controller 146 to the host at a step 216. A return is then made to a main routine at step 206 which enables the library controller to receive, decode, and execute subsequent commands.

If a subsequent command is a subsequent EXCHANGE MEDIUM command issued by the host for returning the cartridge from the revectored drive to its original slot location, the selected drive is logically "unvectored" and thereby removed from a busy list and returned to a "drive available" condition on the drive element list maintained by the library controller 146, while the cartridge is returned to its specified slot location.

While the examples provided herein have specified that the unit 100 include a separate library controller card 146 as a preferred embodiment, those skilled in the art will appreciate that an embedded microcontroller within a tape drive unit 148 has a high level of computing power, and may readily be adapted by additional firmware to intercept the medium changer commands from the host and to pass those commands on to the loader controller via a suitable internal bus structure between the drive 148 and the loader controller 144, as in the example of FIG. 2 but with the library controller function 146 eliminated. In other situations, a separate library controller card 146 may be preferred.

Also, while drive address vectoring as explained herein has been based upon seeking out the closest available drive to the cartridge location, other criteria may be employed to determine the closest available drive. One example is a drive usage monitor which may be invoked by the unit 100 to monitor and equalize wear on the heads of the drives included therewithin. If a drive utilization equalization algorithm is employed within the unit 100, address vectoring will cause other drives to be designated as "closest available drive" in the revectoring process rather than the physically closest drive. Other criteria may also be specified to determine the closest available drive. For example, if a particular tape cartridge is recorded in accordance with an azimuthal recording format, and only one of the drives within the unit 100, such as a DLT7000™ cartridge tape drive for example, supports azimuthal recording, that drive will have its logical address revectored to become the "closest available drive" for handling the azimuthally written data in the particular cartridge.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A digital data storage unit comprising:
   a multiplicity of storage media slots for receiving storage media units,
   a plurality of storage media units loaded in particular ones of the storage media slots,
   a plurality of media unit players physically distributed within the digital data storage unit in relation to the storage media slots, each media unit player having a unique logical storage media unit address,
   a loader mechanism for selectively moving a storage media unit between a storage media slot and one of the plurality of media unit players,
   a storage unit control unit within the digital data storage unit and connected by a bus structure to a host computer for receiving and decoding a storage media unit access request from the host computer, the storage media unit access request including a first logical storage media unit address generated by the host computer, for determining a closest available one of the media unit players to a storage media slot location holding a requested storage media unit, for redirecting the storage media unit access request to a second logical storage media unit address corresponding to the closest available one of the media unit players, and for controlling the loader mechanism for moving the said requested storage media unit from the storage media slot location to the media unit player determined to be the closest available one thereof.

2. The digital data storage unit set forth in claim 1 wherein the storage unit control unit also performs and maintains a storage media unit inventory of the storage media units loaded into particular ones of the storage media slots and uses the storage media inventory in determining the closest available one of the media unit players.

3. The digital data storage unit set forth in claim 1 wherein the bus structure is in accordance with a Small Computer Systems Interface (SCSI) bus structure specification.

4. The digital data storage unit set forth in claim 3 wherein each media unit player is directly connected by the bus structure to the host computer.

5. The digital data storage unit set forth in claim 3 wherein each media unit player is connected through the storage unit control unit to the bus structure.

6. The digital data storage unit set forth in claim 1 wherein at least one of the media unit players includes a microcontroller and the said microcontroller is programmed to perform storage unit control unit functions of receiving and decoding a media unit player access request from the host computer, determining a closest available one of the media unit players to a storage media slot location holding a requested storage media unit, and redirecting the storage media unit access request to the second logical storage media unit address of the closest available one of the media unit players, and wherein the digital data storage unit further comprises a loader controller unit responsive to signals from the said microcontroller for moving the requested storage media unit from the storage media slot location to the media unit player determined to be the closest available one thereof.

7. The digital data storage unit set forth in claim 1 wherein the storage unit control unit determines a closest available one of the media unit players to a storage media slot location at least on the basis of distance within the digital data storage unit between the slot location and the media unit players.

8. The digital data storage unit set forth in claim 7 wherein the storage unit control unit determines a closest available one of the media unit players to a storage media slot location on the basis of additional criteria including at least one of media format of the requested storage media unit, and media unit player wear relative to other media unit players within the digital data storage unit.

9. The digital data storage unit set forth in claim 1 wherein each storage media unit comprises a single-reel tape cartridge, and wherein the media unit players comprise tape drives for writing and reading digital data to and from tape media within each tape cartridge stored in slots of the digital data storage unit.

10. A digital data storage unit comprising:
a multiplicity of storage media slots for receiving tape cartridges, each tape cartridge including at least one spool of magnetic recording tape, the storage media slots being arranged as zones,
at least a plurality of tape cartridges loaded in predetermined storage media slots,
a plurality of tape drives, each of said tape drives being located in close physical proximity to one of said zones of storage media slots, each of said tape drives having a unique logical drive address,
a loader mechanism for selectively moving a tape cartridge between a storage media slot and one of the tape drives,
a storage unit control unit connected by a bus structure to a host computer, the storage unit control unit comprising:
tape cartridge inventory means for obtaining and maintaining an inventory of the tape cartridges loaded into the particular storage media slots,
command decode means for receiving and decoding a slot-to-logical tape drive exchange command including a first logical drive address sent by the host computer,
determination means for determining a closest available one of the tape drives to a storage media slot location identified by the said slot-to-logical tape drive exchange command,
tape drive logical address control means for causing a second logical drive address of the closest tape drive to match the first logical drive address of a destination tape drive in the said slot-to-logical tape drive exchange command, thereby redirecting said slot-to-logical tape drive exchange command to the closest available one of the tape drives, and
loader control means responsive to the tape cartridge inventory means and to the command decode means for operating the loader mechanism to move the requested tape cartridge from the storage media slot location to the closest available tape drive and for loading the requested tape cartridge into the said closest available tape drive,
whereby the physical translation distance and the tape cartridge displacement time between the particular storage media slot and the said closest available tape drive is minimized.

11. The digital data storage unit set forth in claim 10 wherein the bus structure is a Small Computer Systems Interface (SCSI) bus structure.

12. The digital data storage unit set forth in claim 11 wherein each tape drive is directly connected by the SCSI bus structure to the host.

13. The digital data storage unit set forth in claim 11 wherein each tape drive is connected through the storage unit control to the SCSI bus structure.

14. A method for controlling a digital data storage unit comprising a multiplicity of storage media slots for receiving media storage units arranged into plural zones, at least a plurality of media storage units loaded in some of the storage media slots, a plurality of media unit players, each media unit player being located in close physical proximity to one of the said zones of storage media slots and having a unique unit player address, a loader mechanism for selectively moving a media storage unit between a storage media slot and one of the plurality of media unit players, a storage unit control unit connected by a bus structure to a host computer, the method comprising the steps of:
decoding a host command sent by the host computer at the storage control unit including a source address corresponding to a storage media slot location, and a destination address corresponding to a first media unit player specified by the host computer,
determining a second media unit player as a closest available media unit player to the storage media slot location,
redirecting the host command from the first media unit player to the second media unit player, and
moving the media storage unit at the storage media slot location to the said second media unit player.

15. The method for controlling a digital data storage unit set forth in claim 14 comprising further steps of taking an inventory of logical identification of each media storage unit in relation to a storage media slot occupied by the media storage unit and using the inventory in performing the step of determining the second media unit player.

16. The method for controlling a digital data storage unit set forth in claim 14 comprising the further step of establishing and maintaining a list of available media unit players within the digital data storage unit.

17. The method for controlling a digital data storage unit set forth in claim 14 wherein the step of determining the second media unit player to the storage unit slot location is determined on the basis of at least closest physical proximity of a media unit player to the storage unit slot location.

18. The method for controlling a digital data storage unit set forth in claim 17 wherein each media storage unit is recorded with data in one of a plurality of formats, and wherein some but not all available media unit players support a particular format, and wherein the step of determining the second media unit player to the storage unit slot location is determined on the basis of the closest media unit player supporting a format of a particular media storage unit.

19. The method for controlling a digital data storage unit set forth in claim 17 wherein the step of determining the second media unit player to the storage unit slot location is determined additionally upon a basis for equalizing wear among all available media unit players.

20. The method for controlling a digital data storage unit set forth in claim 14 wherein the step of redirecting the host command from the first media unit player to the second media unit player is carried out by changing the unit player address of the second media unit player to correspond to the destination address of the first logical media unit player.

21. The method for controlling a digital data storage unit set forth in claim 14 wherein the step of redirecting the host command from the first media unit player to the second media unit player is carried out by changing the destination address specified by the host computer to correspond to the unit player address of the second media unit player and sending the host command to the second media unit player.

* * * * *